US005257046A

United States Patent [19]

Schmidlin

[11] Patent Number: 5,257,046

[45] Date of Patent: Oct. 26, 1993

[54] DIRECT ELECTROSTATIC PRINTING WITH LATENT IMAGE ASSIST

[75] Inventor: Fred W. Schmidlin, Pittsford, N.Y.

[73] Assignee: Xerox Corporation, Stamford, Conn.

[21] Appl. No.: 937,573

[22] Filed: Aug. 31, 1992

[51] Int. Cl.[5] ...................... G01D 15/06; G03G 15/01

[52] U.S. Cl. ................................ 346/159; 346/153.1; 355/262; 355/327

[58] Field of Search ..................... 346/157, 159, 153.1; 355/326, 327, 328, 261, 262

[56] References Cited

U.S. PATENT DOCUMENTS 3,689,935 9/1972 Pressman et al. .............. 346/74 ES
4,446,471 5/1984 Yano ................................ 346/153.1
4,491,855 1/1985 Fujii et al. ........................... 346/159
4,514,078 4/1985 BeDuchaud et al. ............... 355/277
4,568,955 2/1986 Hosoya et al. ................... 346/153.1
4,810,604 3/2989 Schnidlin .............................. 430/42
4,949,103 8/1990 Schmidlin et al. ............. 346/159 X
5,132,708 7/1992 Schmidlin et al. .................. 346/157
5,132,712 7/1992 Fletcher et al. .................... 346/159
5,153,617 10/1992 Salmon ........................... 346/157 X

*Primary Examiner*—A. T. Grimley
*Assistant Examiner*—Nestor R. Ramirez

[57] ABSTRACT

The quality and resolution of toner images formed using Direct Electrostatic Printing (DEP) are improved when used in combination with a latent electrostatic image or screen pattern formed on a dielectric. A charge pattern is formed on a dielectric and imagewise developed using one or more DEP printers.

20 Claims, 2 Drawing Sheets

DIRECT ELECTROSTATIC PRINTING WITH LATENT IMAGE ASSIST

BACKGROUND OF THE INVENTION

This invention relates to a direct electrostatic printing device and more particularly to the use of an electrostatic latent image in combination with DEP printing for creation of monochrome or color images.

Of the various electrostatic printing techniques, the most familiar is that of xerography wherein latent electrostatic images formed on a charge retentive surface are developed by a suitable toner material to render the images visible, the images being subsequently transferred to plain paper.

A less familiar form of electrostatic printing is one that has come to be known as direct electrostatic printing (DEP). This form of printing differs from the aforementioned xerographic form, in that, the toner or developing material is deposited directly onto a plain (i.e. not specially treated) substrate in image configuration. This type of printing device is disclosed in U.S. Pat. No. 3,689,935 issued Sep. 5, 1972 to Gerald L. Pressman et al.

Pressman et al. disclose an electrostatic line printer incorporating a multilayered particle modulator or printhead comprising a layer of insulating material, a continuous layer of conducting material on one side of the insulating layer and a segmented layer of conducting material on the other side of the insulating layer. At least one row of apertures is formed through the multilayered particle modulator. Each segment of the segmented layer of the conductive material is formed around a portion of an aperture and is insulatively isolated from every other segment of the segmented conductive layer. Selected potentials are applied to each of the segments of the segmented conductive layer while a fixed potential is applied to the continuous conductive layer. An overall applied field projects charged particles through the row of apertures of the particle modulator and the density of the particle stream is modulated according to the pattern of potentials applied to the segments of the segmented conductive layer. The modulated stream of charged particles impinge upon a print-receiving medium interposed in the modulated particle stream and translated relative to the particle modulator to provide line-by-line scan printing. In the Pressman et al device the supply of the toner to the control member is not uniformly effected and irregularities are liable to occur in the image on the image receiving member. High-speed recording is difficult and moreover, the openings in the printhead are liable to be clogged by the toner.

U.S. Pat. No. 4,491,855 issued on Jan. 1, 1985 in the name of Fujii et al discloses a method and apparatus utilizing a controller having a plurality of openings or slit-like openings to control the passage of charged particles and to record a visible image by the charged particles directly on an image receiving member. Specifically disclosed therein is an improved device for supplying the charged particles to a control electrode that has allegedly made high-speed and stable recording possible. The improvement in Fujii et al lies in that the charged particles are supported on a supporting member and an alternating electric field is applied between the supporting member and the control electrode. Fujii et al purports to obviate the problems noted above with respect to Pressman et al. Thus, Fujii et al alleges that their device makes it possible to sufficiently supply the charged particles to the control electrode without scattering them.

U.S. Pat. No. 4,568,955 issued on Feb. 4, 1986 to Hosoya et al discloses a recording apparatus wherein a visible image based on image information is formed on an ordinary sheet by a developer. The recording apparatus comprises a developing roller spaced at a predetermined distance from and facing the ordinary sheet and carrying the developer thereon. It further comprises a recording electrode and a signal source connected thereto for propelling the developer on the developing roller to the ordinary sheet by generating an electric field between the ordinary sheet and the developing roller according to the image information. A plurality of mutually insulated electrodes are provided on the developing roller and extend therefrom in one direction. An A.C. and a D.C. source are connected to the electrodes, for generating an alternating electric field between adjacent ones of the electrodes to cause oscillations of the developer found between the adjacent electrodes along electric lines of force therebetween to thereby liberate the developer from the developing roller.

DEP printing has been utilized in conjunction with conventional xerography as disclosed in U.S. Pat. No. 4,810,604 granted to Fred W. Schmidlin on Mar. 7, 1989. As disclosed therein, a DEP printer is used to deposit toner images on a copy substrate subsequent to the transfer of a xerographically formed image thereto. The DEP image is deposited either before or after fusing of the xerographically formed image.

Toner deposited on a hard smooth surface affects the resolution and quality of DEP images. This is because the toner tends to bounce excessively when propelled against the hard smooth surface. As will be appreciated, toner bounce not only adversely affects the resolution and quality of monochrome images but it also adversely affects image registration when creating color images.

BRIEF DESCRIPTION OF THE INVENTION

A charge pattern is formed on a dielectric receiver and imagewise developed using one or more DEP printers. The charge pattern attracts the toner particles projected by the DEP printer thereby eliminating the bounce. The charge pattern can be either a simple uniform or nonuniform screen or a conventional latent image. An inherent advantage of the use of a conventional latent image is that it collects or attracts toner from a greater distance and, therefore, is more suitable where a greater tendency for bounce exists. The advantage of the uniform screen, on the other hand, is its inherent simplicity. The charge patter can be created using a simple light lens exposure system in combination with a suitable screen or it can be formed using a Raster Output Scanner (ROS). The pattern can also be created using ionography. The toner is pulled into a given spot even if it is aimed off-center by several mils, assuming a 150 to 300 dots per inch (dpi) screen frequency.

The use of a screen or latent electrostatic image in connection with one or more DEP printer exhibits a spatial synchronizing effect between the charge spots and the toner particles thereby providing superior image registration when creating multiple images such as when forming color images.

The multiple level writing capability of DEP enables the deposition of different quantities of toners having different physical properties such as color or magnetic properties. Thus, high quality process color prints are produced as easily as multicolor highlight color prints.

DETAILED DESCRIPTION OF THE DRAWINGS

DESCRIPTION OF THE PREFERRED EMBODIMENT OF THE INVENTION

Figure 3:
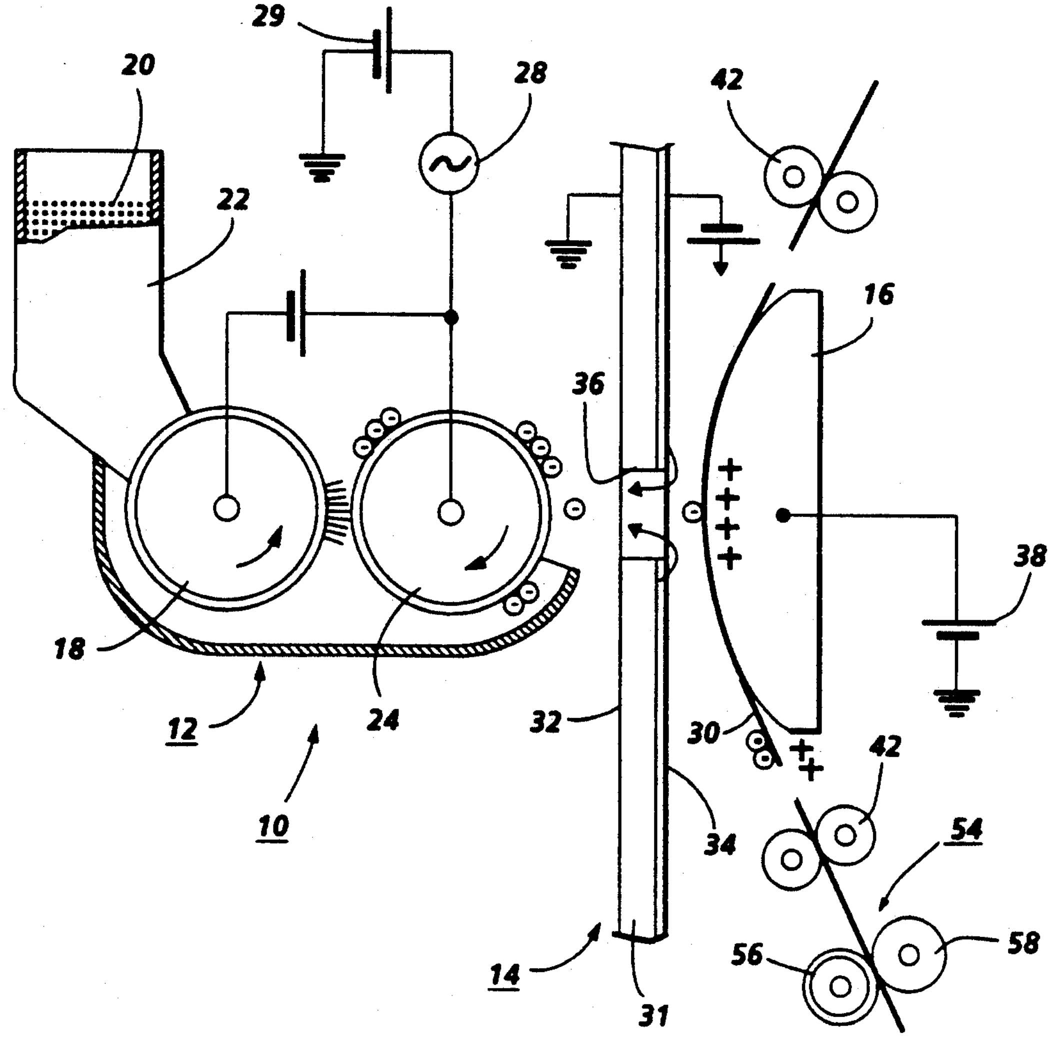
FIG. 3 is a schematic illustration of a prior art DEP printing apparatus.

Disclosed in FIG. 3 is an embodiment of a direct electrostatic printing apparatus 10 representing prior art. The printing apparatus 10 includes a developer delivery system generally indicated by reference character 12, a printhead structure 14 and a backing electrode or shoe 16.

The developer delivery system 12 includes a conventional magnetic brush 18 supported for rotation adjacent a supply of developer 20 contained in a hopper 22. A developer donor roll 24 is supported for rotation intermediate the magnetic brush 18 and the printhead structure 14. The donor roll structure which is preferably coated with Teflon-S (Trademark of E. I. dupont) is spaced from the printhead approximately 0.003 to 0.015 inch. Teflon-S is a tetrafluoroethylene fluorocarbon polymer that is loaded with carbon black. The magnetic brush has a dc bias of about 100 volts applied thereto via a dc voltage source 26. An AC voltage of about 400 volts provided by source 28 with a dc bias of 20 volts provided by source 29 is applied to the donor roll 24. The applied voltages are effective to cause attraction of developer to the brush 18 and to cause transfer of a monolayer of toner to the donor roll 24 from the brush 18. The monolayer is subsequently jumped to the vicinity of the apertures of the printhead. The 20 volts dc bias precludes collection of right sign toner on the shield electrode of the printhead.

The developer preferably comprises any suitable insulative non-magnetic toner/carrier combination having Aerosil (Trademark of Degussa, Inc.) contained therein in an amount equal to ½% by weight and also having zinc stearate contained therein in an amount equal to 1% by weight.

The foregoing developer delivery or supply system provides an improved arrangement for controlling the mass and charge of the toner and, in particular, the percentage of wrong sign toner that is ultimately presented to the printhead 14. The toner/carrier mix used results in favorable charge distribution in the toner. This results in a reduction in the contamination rate of the printhead.

The printhead structure 14 comprises a layered member including an electrically insulative base member 31 fabricated from a polyimide film approximately 0.001 inch thick. The base member is clad on the one side thereof with a continuous conductive layer or shield 32 of aluminum which is approximately one micron thick. The opposite side of the base member 30 carries segmented conductive layer 34 thereon which is fabricated from aluminum. A plurality of holes or apertures 36 (only one of which is shown) approximately 0.007 inch in diameter are provided in the layered structure in a pattern suitable for use in recording information. The apertures form an electrode array of individually addressable electrodes. With the shield grounded and zero volts applied to an addressable electrode, toner is propelled through the aperture associated with that electrode. The aperture extends through the base 31 and the conductive layers 32 and 34.

With a negative 350 volts applied to an addressable electrode toner is prevented from being propelled through the aperture. Image intensity can be varied by adjusting the voltage on the control electrodes between 0 and minus 350 volts. Addressing of the individual electrodes can be effected in any well known manner know in the art of printing using electronically addressable printing elements.

The electrode or shoe 16 has an arcuate shape as shown but as will be appreciated, the present invention is not limited by such a configuration. The shoe which is positioned on the opposite side of a plain paper recording medium 30 from the printhead deflects the recording medium in order to provide an extended area of contact between the medium and the shoe.

The recording medium 30 may comprise cut sheets of paper fed from a supply tray 40. The sheets of paper are spaced from the printhead 14 a distance in the order of 0.005 to 0.030 inch as they pass thereby. The sheets 30 are transported in contact with the shoe 16 via edge transport roll pairs 42.

During printing the shoe 16 is electrically biased to a dc potential of approximately 400 volts via a dc voltage source 38.

Figure 1:
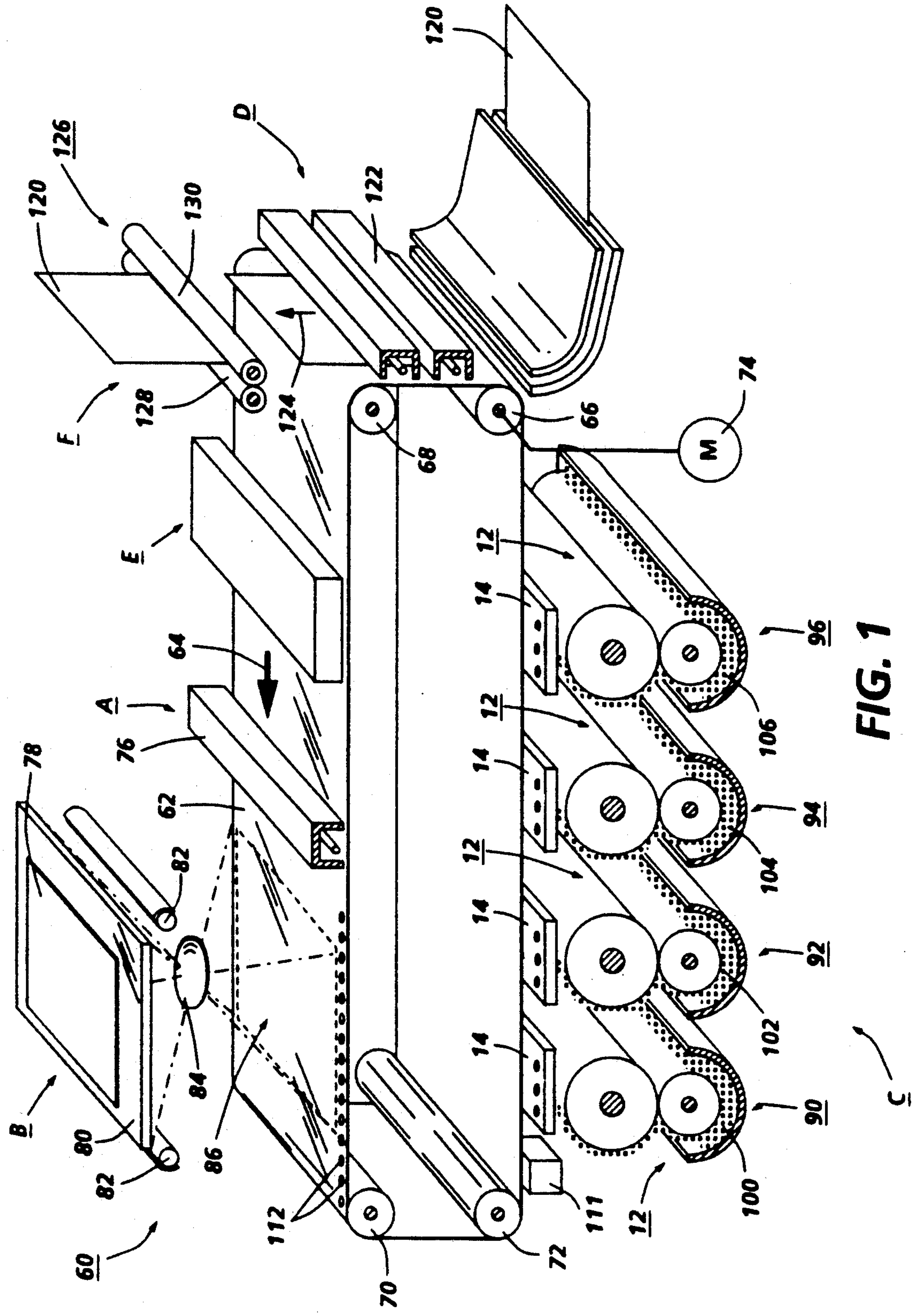
FIG. 1 is a schematic illustration of a printing apparatus according to the invention.

As disclosed in FIG. 1, an imaging apparatus of the present invention which is designated by reference character 60 utilizes a charge retentive member in the form of a photoconductive belt 62 consisting of a photoconductive surface and an electrically conductive substrate and which is mounted for movement past a charging station A, an exposure B, DEP imaging station C, transfer station D and cleaning station E. Belt 62 moves in the direction of arrow 64 to advance successive portions thereof sequentially through the various processing stations disposed about the path of movement thereof. Belt 62 is entrained about a plurality of rollers 66, 68, 70 and 72 the former of which can be used as a drive roller and the latter two of which can be used to provide suitable tensioning of the photoreceptor belt 10. A motor 74 rotates roller 66 to advance belt 62 in the direction of arrow 64. Roller 66 is coupled to motor 74 by suitable means such as a belt drive.

As can be seen by further reference to FIG. 1, initially successive portions of belt 62 pass through charging station A. At charging station A, a corona discharge device such as a scorotron, corotron or dicorotron indicated generally by the reference numeral 76, charges the belt 62 to a selectively high uniform positive or negative potential. Preferably charging is positive. Any suitable control, well known in the art, may be employed for controlling the corona discharge device 76.

Next, the charged portions of the photoreceptor surface are advanced through exposure station B. At exposure station B, a screen pattern is positioned on a transparent platen 80. Lamps 82 flash light rays reflected form the screen pattern. The light rays reflected from the screen pattern are transmitted through a lens 84 and impinge on the dielectric belt 62 thereby form a latent screen pattern 86 thereon.

The latent image screen pattern on the belt is next moved through the DEP printing station C. A plurality of DEP printers 92, 94, 96 and 90 are sequentially disposed at station C for forming one or more toner images on the belt 62 which are superimposed onto the screen pattern 86.

Each of these printers comprises a printhead structure 14 and a toner delivery system 12. Each DEP printer is adapted to deposit a different color toner, for example, black toner 100, cyan toner 102, magenta toner 104 and yellow toner 106. An Electronic Subsystem (ESS) 110 operatively connected to each of the printers 92, 94, 96 and 90 serves to timely actuate one or more of the printers in accordance with image information stored in memory forming a part of the ESS. For example, image information may correspond to a monochrome black image to be printed by printer 90, in which case, only printer 90 is actuated during the formation of the image. Alternately, full color (i.e. toners of different colors deposited on top of each other) or highlight color (i.e. toners of different colors or other physically distinct toner deposited adjacent each other) may be created. In the monochrome mode of operation the screen image has a field corresponding to a conventional xerographically formed image.

Figure 2:
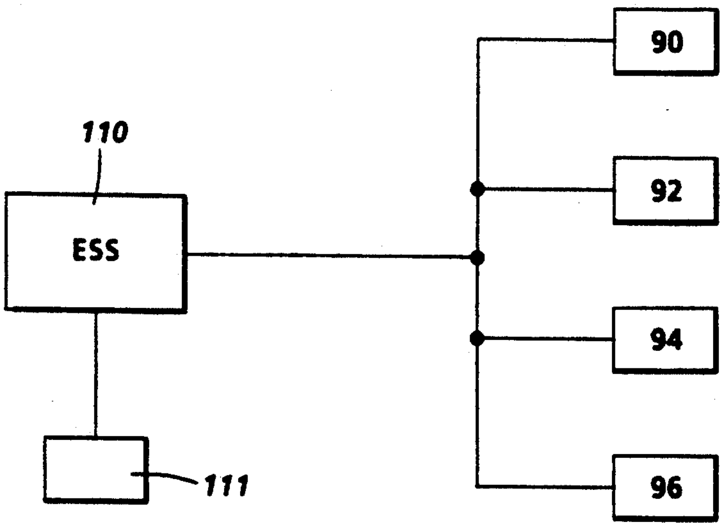
FIG. 2 is a schematic illustration showing the interconnection of various components of the apparatus of FIG. 1.

As shown in FIG. 2, the ESS is operatively connected to the printers 90 through 96 as well as the voltage sensor 111. The ESS comprises suitable circuitry and controls, well known in the art, for addressing the selected apertures of each of the printheads of the printers according to the information to be printed. Deposition of different quantities of toner by the different printers as well as the electrical biases associated with the toner delivery system s is also controlled through operation of the ESS.

Electrical signals generated by a high resolution voltage sensor 111 serve to control and adjust the pixel initiation time of selected printers with respect to charge spots 112 formed on the belt 62. Proper phasing of printer actuation relative to the location of the screen pattern as it passes through the station C assists in image registration and toner guidance to the desired charge spot.

The deposition of correctly registered images, according to the invention, requires that a minimum electrostatic field be provided by the screen pattern 86. Otherwise, the deposition of a desired quantity of toner is independent of the image charge at the time an image is deposited. Thus, the DEP printers are unaffected by the charge neutralization of the screen pattern resulting from a previously developed image.

A sheet of support material 120 is moved into contact with the toner image at transfer station D. The sheet of support material is advanced to transfer station D by conventional sheet feeding apparatus, not shown. Preferably, the sheet feeding apparatus includes a feed roll contacting the uppermost sheet of a stack copy sheets. Feed rolls rotate so as to advance the uppermost sheet from stack into a chute which directs the advancing sheet of support material into contact with photoconductive surface of belt 62 in a timed sequence so that the toner powder image developed thereon contacts the advancing sheet of support material at transfer station D.

Transfer station D includes a corona generating device 122 which sprays ions of a suitable polarity onto the backside of sheet 120. This attracts the charged toner powder images from the belt 62 to sheet 120. After transfer, the sheet continues to move, in the direction of arrow 124, onto a conveyor (not shown) which advances the sheet to a fusing station F.

Fusing station F includes a fuser assembly, indicated generally by the reference numeral, which permanently affixes the transferred powder image to sheet 120. Preferably, fuser assembly 126 comprises a heated fuser roller 128 and a backup roller 130. Sheet 120 passes between fuser roller 128 and backup roller 130 with the toner powder image contacting fuser roller 128. In this manner, the toner powder image is permanently affixed to sheet 120. After fusing, a chute, not shown, guides the advancing sheet 120 to a catch tray, also not shown, for subsequent removal from the printing machine by the operator.

After the sheet of support material is separated from photoconductive surface of belt 62, the residual toner particles carried by the non-image areas on the photoconductive surface are removed therefrom. These particles are removed at cleaning station E.

Subsequent to cleaning, a discharge lamp (not shown) floods the photoconductive surface with light to dissipate any residual electrostatic charge remaining prior to the charging thereof for the successive imaging cycle.

What is claimed is:

1. A method of printing toner images, said method including the steps of:

forming a latent image on a photoconductive surface; and using Direct Electrostatic Printing (DEP) to deposit a toner image on said latent image.

2. The method according to claim 1 wherein said step of forming a latent image comprises forming a screen pattern.

3. The method according to claim 2 wherein said latent image is created using a light lens exposure device.

4. The method according to claim 2 wherein said step of using direct electrostatic printing comprises using a plurality of direct electrostatic printing devices.

5. The method according to claim 4 wherein said step of using a plurality of direct electrostatic printing devices comprises using toners having different physical properties.

6. The method according to claim 5 wherein said step of using toners having different physical properties includes using toners of different colors.

7. The method according to claim 2 wherein the step of using direct electrostatic printing comprises selectively using one or more direct electrostatic printing devices.

8. The method according to claim 7 wherein the step of selectively using one or more direct electrostatic printing devices comprises depositing toner images having different physical properties.

9. The method according to claim 5 wherein said step of depositing toners having different physical properties comprises using toners of different colors.

10. The method according to claim 2 wherein said step of creating a latent image is effected using a laser device.

11. Apparatus for printing toner images, said apparatus comprising:

means for forming a latent image on a charge retentive surface; and at least one Direct Electrostatic Printer (DEP) for depositing a toner image on said latent image.

12. Apparatus according to claim 11 wherein said means for forming a latent image comprises means for forming a screen pattern.

13. Apparatus according to claim 12 wherein said means for forming latent images comprises a light lens exposure device.

14. Apparatus according to claim 12 including a plurality of direct electrostatic printers.

15. Apparatus according to claim 14 wherein said plurality of direct electrostatic printing devices include toners having different physical properties.

16. Apparatus according to claim 15 wherein said toners having different physical properties comprise toners of different colors.

17. Apparatus according to claim 15 wherein said toners having different physical properties are of different colors.

18. Apparatus according to claim 12 including means for selectively using one or more direct electrostatic printing devices.

19. Apparatus according to claim 18 wherein said printing devices have toners with different physical properties.

20. Apparatus according to claim 12 wherein said means for forming latent images comprises a laser device.

* * * * *